(12) United States Patent
Nelson et al.

(10) Patent No.: US 8,180,075 B2
(45) Date of Patent: May 15, 2012

(54) ARRANGEMENT FOR VARIABLE BASS REFLEX CAVITIES

(75) Inventors: Glenn R. Nelson, Boynton Beach, FL (US); Brian T. Fein, Tamarac, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1419 days.

(21) Appl. No.: 11/740,679

(22) Filed: Apr. 26, 2007

(65) Prior Publication Data

US 2008/0268793 A1   Oct. 30, 2008

(51) Int. Cl.
*H04R 25/00* (2006.01)
*H04R 1/20* (2006.01)

(52) U.S. Cl. .......................... 381/160; 381/345

(58) Field of Classification Search .................. 181/156, 181/199; 381/152, 345, 349, 353, 160, 352, 381/354, 337, 338; 455/90.3
See application file for complete search history.

(56) References Cited

U.S. PATENT DOCUMENTS

| | | | |
|---|---|---|---|
| 4,268,718 A * | 5/1981 | Clark, Jr. .................... | 381/332 |
| 4,856,071 A | 8/1989 | Marquiss | |
| 5,286,928 A | 2/1994 | Borland | |
| 5,696,357 A | 12/1997 | Starobin | |
| 5,783,780 A * | 7/1998 | Watanabe et al. ............. | 181/229 |
| 5,892,183 A | 4/1999 | Roozen et al. | |
| 5,963,640 A | 10/1999 | Rabe | |
| 5,974,157 A * | 10/1999 | Tajima et al. ................. | 381/354 |
| 6,002,949 A | 12/1999 | Hawker et al. | |
| 6,064,894 A | 5/2000 | Zurek et al. | |
| 6,104,808 A | 8/2000 | Alameh et al. | |
| 6,144,751 A | 11/2000 | Velandia | |
| 6,275,597 B1 | 8/2001 | Roozen et al. | |
| 6,359,994 B1 | 3/2002 | Markow et al. | |
| 6,411,720 B1 | 6/2002 | Pritchard | |
| 6,411,722 B1 | 6/2002 | Wolf | |
| 6,473,625 B1 * | 10/2002 | Williams et al. ........... | 455/569.1 |

(Continued)

FOREIGN PATENT DOCUMENTS

AT       409910 B       4/2002

(Continued)

OTHER PUBLICATIONS

Andrey K. Morozov and Douglas C. Webb; "A Sound Projector for Acoustic Tomography and Global Ocean Monitoring", IEEE J. Oceanic Engineering, Apr. 2003, pp. 174-185, vol. 28 No. 2.

(Continued)

*Primary Examiner* — Fan Tsang
*Assistant Examiner* — Eugene Zhao
(74) *Attorney, Agent, or Firm* — Pablo Meles; Sylvia Chen

(57) ABSTRACT

A modified housing in a portable product (400, 500, 700, or 800) includes a housing detail (405, 506, 706 or 710 or 806) forming at least a portion of a loud speaker back cavity having a pipe inner diameter for a resonant pipe (408, 508, 708, or 808), and a modification to the housing detail altering a cross section area of the pipe inner diameter to compensate for changes to a loud speaker back cavity volume. The housing detail can include a battery door (404, 504, 704) for the portable product that forms at least one side of the resonant pipe. The battery door can define the loud speaker back cavity volume and further fills at least part of the resonant pipe in a manner that maintains the loud speaker back cavity volume and the cross sectional area of the pipe inner diameter at a predetermined ratio.

20 Claims, 4 Drawing Sheets

U.S. PATENT DOCUMENTS

| | | |
|---|---|---|
| 6,634,455 B1 | 10/2003 | Yang |
| 6,636,750 B1 | 10/2003 | Zurek et al. |
| 6,758,303 B2 | 7/2004 | Zurek et al. |
| 7,092,745 B1 | 8/2006 | D'Souza |
| 7,280,666 B2 | 10/2007 | Guyot et al. |
| 7,324,655 B2 | 1/2008 | Sato |
| 7,343,181 B2 | 3/2008 | Chan et al. |
| 7,382,048 B2 | 6/2008 | Minervini |
| 7,447,009 B2 | 11/2008 | Wang et al. |
| 7,508,933 B2 * | 3/2009 | Yang .................. 379/433.02 |
| 7,876,922 B2 * | 1/2011 | Park et al. .................. 381/388 |
| 2001/0039200 A1 | 11/2001 | Azima et al. |
| 2002/0027999 A1 * | 3/2002 | Azima et al. .................. 381/431 |
| 2003/0068063 A1 | 4/2003 | Usuki et al. |
| 2004/0028246 A1 * | 2/2004 | Maekawa et al. .............. 381/111 |
| 2004/0165359 A1 | 8/2004 | Cheng et al. |
| 2005/0031148 A1 | 2/2005 | McNary |
| 2005/0190941 A1 | 9/2005 | Yang |
| 2007/0019820 A1 | 1/2007 | Zurek et al. |
| 2007/0025582 A1 | 2/2007 | Rashish et al. |
| 2007/0029131 A1 | 2/2007 | Pan et al. |
| 2007/0189566 A1 | 8/2007 | Yamagishi et al. |
| 2007/0223745 A1 * | 9/2007 | Feng et al. .................... 381/160 |
| 2008/0130931 A1 | 6/2008 | Hampton et al. |
| 2009/0129623 A1 | 5/2009 | Weckstrom et al. |
| 2009/0169041 A1 | 7/2009 | Zurek et al. |

FOREIGN PATENT DOCUMENTS

| | | |
|---|---|---|
| FR | 2770734 A1 | 7/1999 |
| JP | 2005136895 A | 5/2005 |
| JP | 20065616 A1 | 1/2006 |
| JP | 3997133 B2 | 10/2007 |
| KR | 200144783 Y1 | 6/1999 |
| KR | 1020040040519 A | 5/2004 |
| KR | 200417799 Y1 | 6/2006 |
| WO | 2007111650 A1 | 10/2007 |

OTHER PUBLICATIONS

United States Patent and Trademark Office, "Non-Final Office Action Summary" for U.S. Appl. No. 11/675,118, Mar. 7, 2011, 13 pages.

* cited by examiner

Acoustic Performance

Speaker Impedance

ARRANGEMENT FOR VARIABLE BASS REFLEX CAVITIES

FIELD

This invention relates generally to sound cavities, and more particularly to acoustic back volumes for speakers in portable devices and a method and arrangement for compensating for changes to such back volumes.

BACKGROUND

Recent cellular phone designs and features desired by the consuming market are driving demand for better high audio speaker low end frequency performance. In the past, much of the audio speaker performance and design was driven primarily by a voice centric device. Current phone designs fail to adequately compensate for the new multimedia capabilities found in phones which continue to be designed primarily around voice centric specifications. Further aggravating or complicating the demand for better high audio speaker low end frequency performance is the trend of phones getting smaller resulting in smaller high audio speaker back cavity volumes. As the speaker back cavity volumes reduce, the speakers resonant frequency raises and low frequency performance is degraded. With phones getting smaller, maintaining the low end frequency performance presently achieved in prior larger phones (whether the phone is used for multimedia or not) presents a greater challenge for designers.

Some applications are implementing different size battery doors to enlarge the loud speaker back volume. When the back cavity size changes, the bass reflex frequency will change, unless something else changes to compensate. Bass reflex theory is found in many textbooks and products such as standard non-portable speakers that do not have replaceable housings. Such existing devices do not need to contend with implementing a variability of parameters to maintain an appropriate bass reflex effect at a specific frequency. Certainly, base reflex theory has not been applied to high audio loud speakers in cellular phones and other portable electronic devices where the speaker back volumes can vary based on alternate replaceable housing configurations.

SUMMARY

Embodiments in accordance with the present invention can provide a method and arrangement for compensating for changes in speaker back volume to enable improved high audio speaker low end frequency performance across variable configurations in a portable electronic product such as a cellular phone. Several embodiments herein propose a variation of the resonant pipe dimensions to compensate for the change in back volumes caused by different size battery doors. Of course, speaker back volumes are not necessarily changed by battery doors only on a portable product, but other housing alterations can change the back volumes. In any case, the embodiments herein compensate for such changes in back volume to maintain high audio speaker low end frequency performance or an appropriate bass reflex effect.

In a first embodiment of the present invention, a modified housing in a portable product can include a housing detail forming at least a portion of a loud speaker back cavity having a pipe inner diameter for a resonant pipe, and a modification to the housing detail altering a cross section area of the pipe inner diameter to compensate for changes to a loud speaker back cavity volume. The housing detail can include a battery door for the portable product that forms at least one side of the resonant pipe. The battery door can define the loud speaker back cavity volume and further fills at least part of the resonant pipe in a manner that maintains the loud speaker back cavity volume and the cross sectional area of the pipe inner diameter at a predetermined ratio. The battery door can also define the loud speaker back cavity volume and further fill a full length of the resonant pipe in a manner that likewise maintains the loud speaker back cavity volume and the cross section area of the pipe inner diameter at a predetermined ratio.

The housing detail can further include a filler volume (such as a solid or hollow rod) that resides within the resonant pipe and reduces the cross sectional area of the pipe inner diameter. The filler volume (such as a rod) can run the full length of the resonant pipe. The housing detail can be an interchangeable battery door housing having a filler volume that resides within the resonant pipe and runs the full length of the resonant pipe. Thus, a larger battery door forming a larger loud speaker back cavity volume includes a filler volume (such as a rod) with a smaller fill rod diameter whereas an alternative smaller battery door forming a smaller loud speaker back cavity volume includes a filler volume with a larger fill rod diameter.

In yet other variations, the housing detail can include a battery door having an integrated pipe molded as part of the battery door that provides a resonant pipe matched to the loud speaker back cavity volume created from mounting the battery door on to the portable product. The housing detail can also include a battery having a rod attached thereto that resides within the resonant pipe and runs the full length of the resonant pipe when the battery is within the portable product. The modified housing can also include exchangeable beauty rings, bezels, grills, replacement front housings or replacement rear housings for the portable product that modifies the loud speaker back cavity or the cross section area of the pipe inner diameter.

In a second embodiment of the present invention, a battery door for a portable product can include a housing detail forming at least a portion of a loud speaker back cavity having a pipe inner diameter for a resonant pipe within the portable product, and a modification to the housing detail altering a cross section area of the pipe inner diameter to compensate for changes to a loud speaker back cavity volume. The battery door can define the loud speaker back cavity volume and further fills a full length of the resonant pipe in a manner that maintains the loud speaker back cavity volume and the cross section area of the pipe inner diameter at a predetermined ratio. The housing detail can be a filler volume that resides within and runs the full length of the resonant pipe and reduces the cross sectional area of the pipe inner diameter. As noted above, the battery door can alternatively or optionally include an integrated pipe molded as part of the battery door that provides a resonant pipe matched to the loud speaker back cavity volume created from mounting the battery door on to the portable product.

In a third embodiment of the present invention, a portable audio product having an interchangeable housing can include a housing detail forming at least a portion of a loud speaker back cavity having a pipe inner diameter for a resonant pipe and a modification to the housing detail altering a cross section area of the pipe inner diameter to compensate for changes to a loud speaker back cavity volume of the portable audio product. The housing detail can include a battery door that defines the loud speaker back cavity volume and further fills a full length of the resonant pipe in a manner that maintains the loud speaker back cavity volume and the cross section area of the pipe inner diameter at a predetermined ratio. The housing detail can be an interchangeable battery door housing having a filler volume that resides within the resonant pipe and runs the full length of the resonant pipe wherein a larger battery door forms a larger loud speaker back cavity volume that includes the filler volume with a smaller fill rod diameter or a smaller battery door forms a smaller loud speaker back cavity volume that includes the filler volume with a larger fill rod diameter. Again, the housing detail can be a battery door having an integrated pipe molded as part of the battery door that provides a resonant pipe matched to the loud speaker back cavity volume created from mounting the battery door on to the portable audio product. The portable audio product can be any number of products including a cellular phone, a two-way radio, a smart phone, a personal digital assistant, laptop computer, an MP3 Player, portable speakers, or a portable music player The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "modified housing," "housing detail," "housing feature," "modification to a housing" and the like as used herein, are defined as modified housings altered to maintained a predetermined ratio between a resonant pipe cross-sectional area and a resonant pipe length and/or loud speaker back cavity volume. The "loud speaker back cavity" or "back cavity volume" is a volume generally behind a loud speaker within a sealed or substantially sealed cavity. A "filler volume" is a volume that alters the volume and hence the resonant pipe cross-sectional area of the resonant pipe. Although the filler volume is generally thought to fill the entire length of the resonant pipe, the filler volume is not necessarily limited to such restriction as defined herein. The term "resonant pipe" can be a cylindrical or spherical pipe or of any other shape allowing sound to resonate. The pipe will typically have at least one open end. The term "integrated" as used herein can include a molded or fixed feature that forms at least a wall or other side of resonant pipe or can form the entire dimensions of the resonant pipe.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
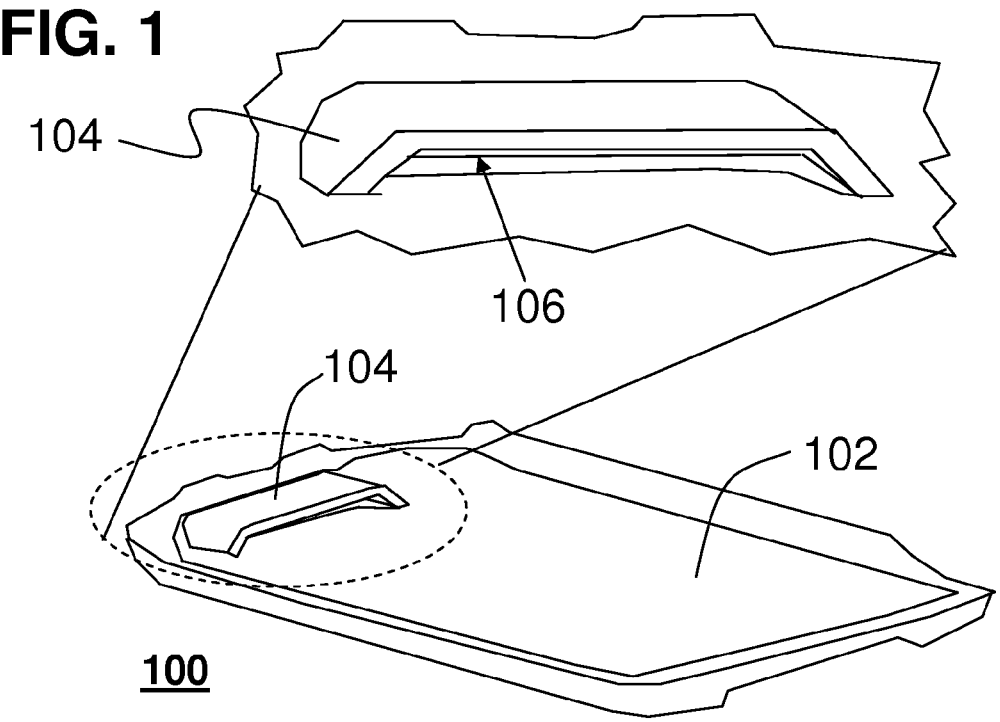
FIG. 1 is an internal view of a modified housing having a housing detail (also in a zoomed view) forming a portion of a loud speaker back cavity having an resonant pipe in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways that can change a resonant pipe cross-sectional area or a bass reflex in a portable electronic product such as a communication product having a sealed back cavity volume.

Bass reflex uses Helmholtz theory to resonate a sealed back cavity volume of a loud speaker enclosure using a pipe or tube of a specific length and diameter. The Helmholtz theory can generally be recited as follows:

$$f_h = \frac{c_0}{2}\sqrt{\frac{S}{LV}}$$

where:
$f_h$ is the resonant frequency where you need acoustic enhancement.
c is speed of sound in the medium, constant.
S is cross section area of the pipe inner diameter.
L is the length of the pipe.
V is loud speaker back cavity volume.

Figure 9:
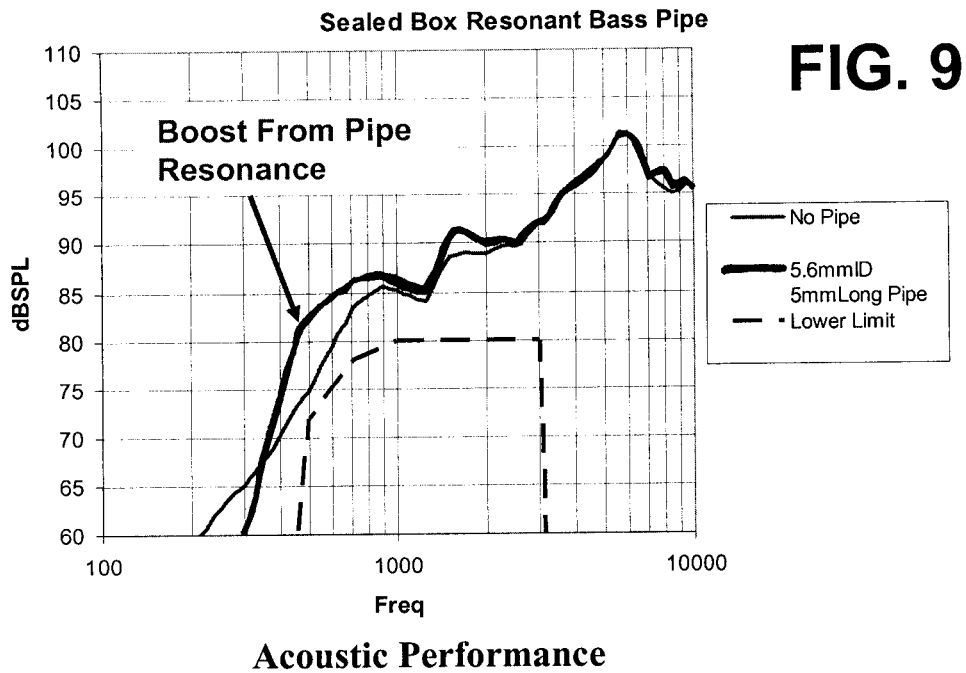
FIG. 9 is a chart illustrating the difference in acoustic performance between a product housing having a resonant pipe and no resonant pipe in accordance with an embodiment of the present invention.
Figure 10:
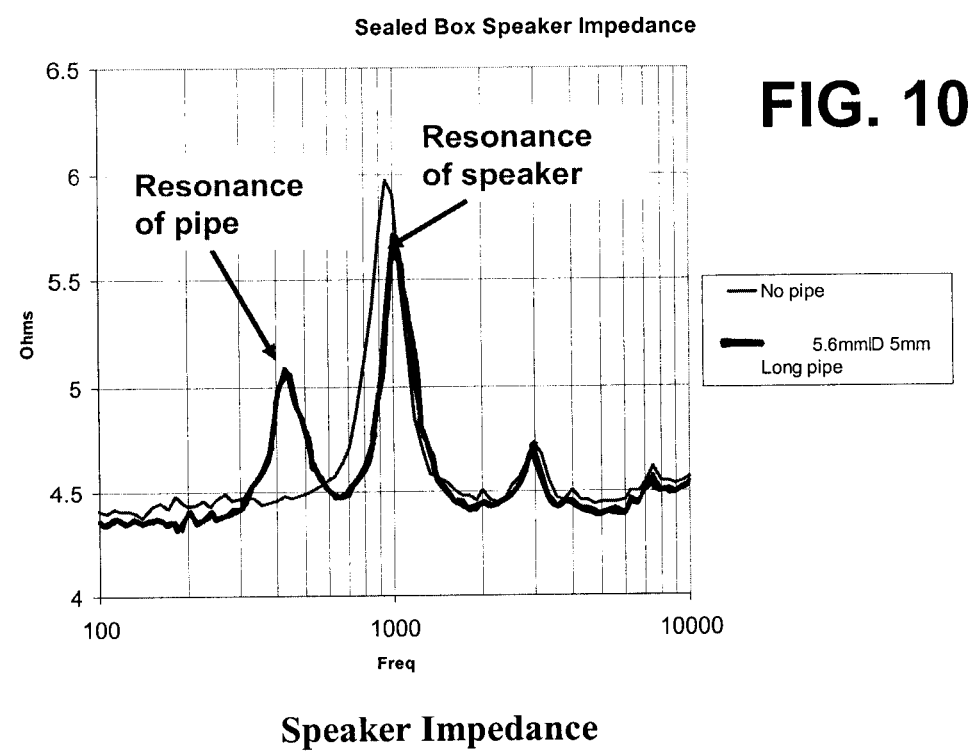
FIG. 10 is another chart illustrating the difference in speaker impedance between a product housing having a resonant pipe and no resonant pipe in accordance with an embodiment of the present invention.

Therefore, as the speaker back cavity volume increases, the cross-sectional area can enlarge to maintain the same Helmholtz resonant frequency to yield acoustic improvement. In some portable electronic products such as mobile communication radios, optional longer life batteries having larger dimensions can require a replacement battery door that can increase the size of a loud speaker back cavity volume. The graphs illustrated in FIGS. 9 and 10 demonstrate the acoustic enhancement that can be obtained from a bass reflex application in a phone. The graph of FIG. 10 is an impedance graph showing the resonant frequency of the pipe and further demonstrates the correlation of the improvement at lower frequencies when compared with the graph of FIG. 9. Thus, altering the cross section area "S" of the pipe inner diameter can compensate for changes to a loud speaker back cavity volume "V" in order to substantially maintain the same resonant frequency $f_h$.

In light of these characteristics, there are several ways to alter the pipe cross-section area in accordance with the embodiments of the invention in a portable electronic product. One method or arrangement utilizes the practice of using replacement battery doors for different size batteries. Such replacement battery doors can be modified or customized to improve the bass reflex performance.

Figure 2:
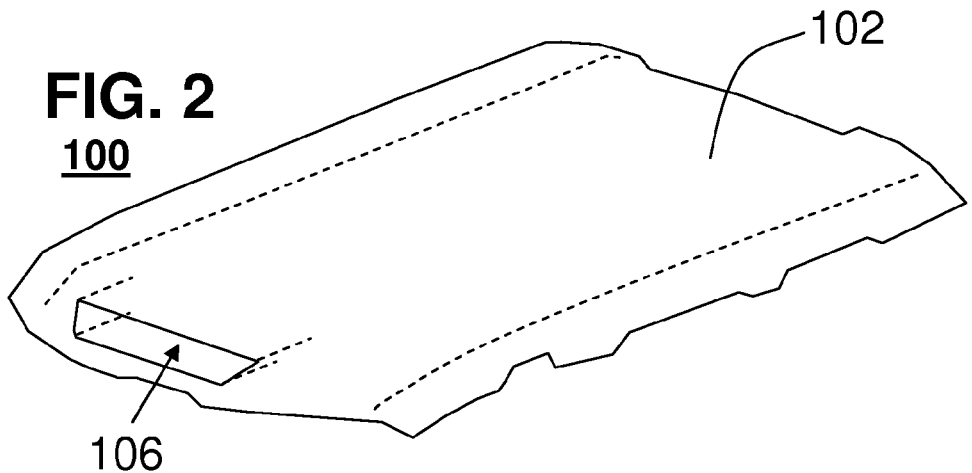
FIG. 2 is an external view of the modified housing of FIG. 1 in accordance with an embodiment of the present invention.
Figure 3:
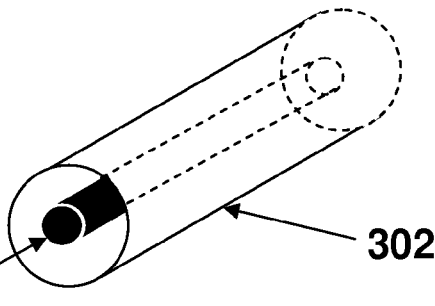
FIG. 3 is resonant pipe having filler volume or rod in accordance with an embodiment of the present invention.

For example, as seen in FIGS. 1 and 2, a modified housing 100 in a portable product can include a housing detail 104 forming at least a portion of a loud speaker back cavity having a pipe inner diameter for a resonant pipe 106, and a modification to the housing detail altering a cross section area of the pipe inner diameter to compensate for changes to a loud speaker back cavity volume. The housing detail 104 can include or be a portion of a battery door 102 for the portable product that forms at least one side of the resonant pipe. Also, there are many ways that the cross-sectional area of a resonant pipe 300 can be further modified as shown in FIG. 3. For example, a filler volume 304 such as a solid or hollow rod can be placed within a cavity or tube 302 of the resonant pipe 300. The filler volume 304 can generally run the length of the resonant pipe 300 and can be centered or placed in other locations within the resonant pipe 300.

Figure 4:
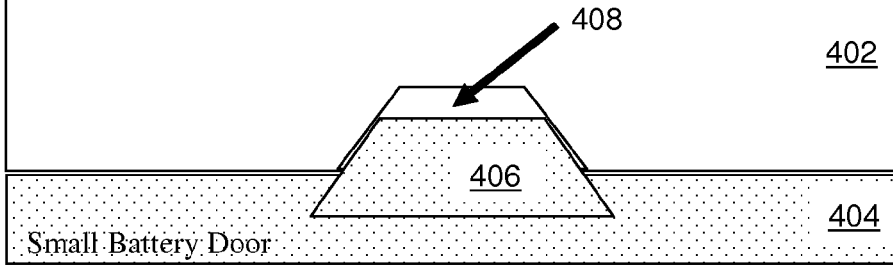
FIG. 4 is a bottom view of a portable product housing having a smaller battery door and a resonant pipe in accordance with an embodiment of the present invention.
Figure 5:
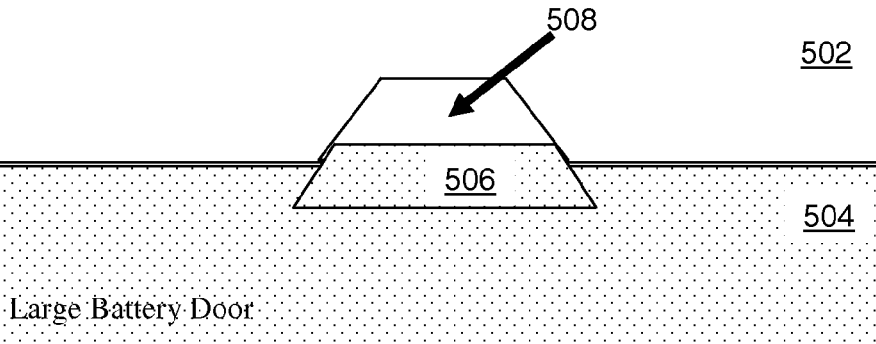
FIG. 5 is a bottom view of a portable product housing having a large battery door and a resonant pipe in accordance with an embodiment of the present invention.
Figure 6:
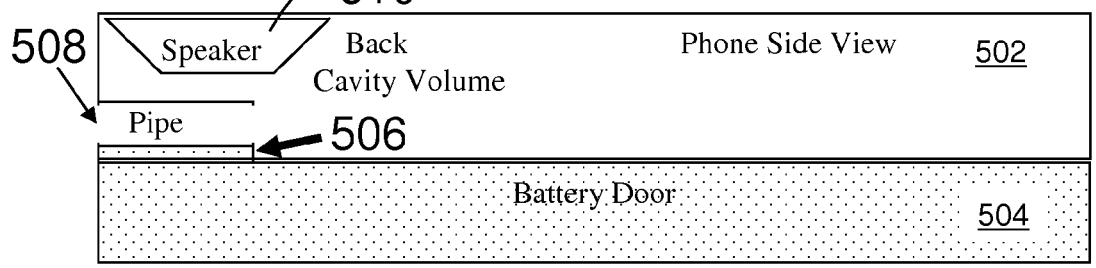
FIG. 6 is a side view of the portable product housing of either FIG. 5 or 6 in accordance with an embodiment of the present invention.

Referring to FIGS. 4-6, a battery door 404 or 504 can define a loud speaker back cavity volume in conjunction with a main housing 402 or 502 and can further fill at least part of the resonant pipe 408 or 508 in a manner that maintains the loud speaker back cavity volume and the cross sectional area of the pipe inner diameter at a predetermined ratio that will provide a proper bass reflex. As shown, FIGS. 4 and 5 illustrate a bottom view of an external open end of a resonant pipe for a portable electronic product 400 or 500 such as a cellular phone and FIG. 6 illustrates a side view of the portable electronic product 500 having a speaker 510 and corresponding back cavity volume. The battery door can also fill a full length of the resonant pipe in a manner that likewise maintains the loud speaker back cavity volume and the cross section area of the pipe inner diameter at a predetermined ratio as can be defined by the Helmholtz bass reflex theory as explained above. Thus, a battery door 404 or 504 can include a housing detail or feature 406 or 506 that defines the dimension of the resonant pipe 408 or 508 respectively. Note, the housing detail or feature 406 or 506 can be a portion of or be integrated or molded into the battery door itself or can alternatively or optionally be the battery itself.

As previously shown in FIG. 3, the housing detail can further include a filler volume (such as a solid or hollow rod) that resides within the resonant pipe and reduces the cross sectional area of the pipe inner diameter. The filler volume (such as the rod) can run the full length of the resonant pipe. The housing detail can be an interchangeable battery door housing having a filler volume that resides within the resonant pipe and runs the full length of the resonant pipe. Thus, a larger battery door 504 as shown in FIG. 5 forming a larger loud speaker back cavity volume includes a filler volume (such as a rod or a portion of the housing detail 506) with a smaller fill rod diameter whereas an alternative smaller battery door as shown in FIG. 4 forming a smaller loud speaker back cavity volume includes a filler volume (such as housing detail 406) with a larger fill rod diameter. Again, as can be determined from the Helmholtz theory, the cross section area "S" of the pipe inner diameter is directly proportional to the length "L" of the pipe and the loud speaker back cavity volume "V".

Figure 7:
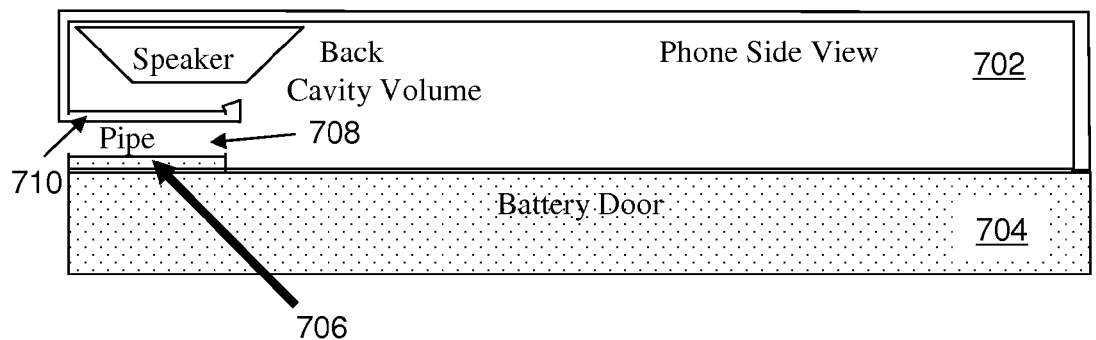
FIG. 7 is a side view of a portable product housing using a housing cover or bezel to modify a resonant pipe diameter in accordance with an embodiment of the present invention.

In yet other variations, the housing detail can include a battery door having an integrated pipe molded as part of the battery door as shown in FIG. 1 that provides a resonant pipe matched to the loud speaker back cavity volume created from mounting the battery door on to the portable product. Referring to the portable electronic product 700 of FIG. 7, the modified housing can also include exchangeable beauty rings, bezels, grills, housing over-molds, replacement front housings or replacement rear housings for the portable product that modifies the loud speaker back cavity or the cross section area of the pipe inner diameter. In this instance, a housing cover or bezel 710 covers the main housing 702 and modifies the cross section area of the resonant pipe inner diameter of the resonant pipe 708 and/or modifies the loud speaker back cavity. In this example, a housing detail 706 on the battery door 704 should also be considered when designing the physical dimensions of the bezel or cover 710.

Figure 8:
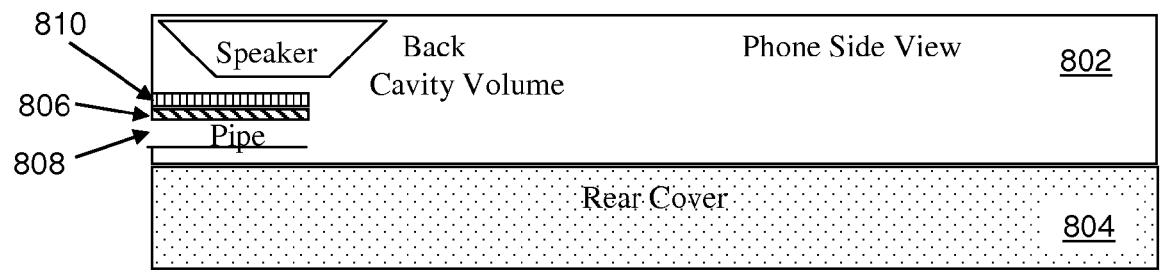
FIG. 8 is a side view of a portable product housing having a battery therein that further includes a filler volume or rod attached to the battery to modify a resonant pipe diameter of the portable product in accordance with an embodiment of the present invention.

Referring to the portable electronic product 800 of FIG. 8, the housing detail can also include a battery 810 having a rod 806 attached thereto that resides within the resonant pipe 808 and runs the full length of the resonant pipe 808 when the battery 810 is within the portable product. In this instance, the battery 810 can reside within a main housing 802 while a rear cover 804 further defines the back cavity volume.

As noted above, the embodiments herein are not necessarily limited to battery doors, but can include other housing portions that can form or define one or more sides of a resonant pipe. Further note, the pipe is not limited to a tubular shape and can take many forms in accordance with the embodiments. In one particular embodiment, the housing detail can be a battery door having an inside detail that forms one side of the resonant pipe. Inasmuch as the battery door size creates a different size back cavity volume, then the door detail can not only form one side of the pipe but can also fill part of the pipe for the full length of the pipe to maintain an appropriate resonant frequency for the pipe and volume. In some instances, the full length of the pipe may not need to be filled, but other adjustments to other portions of the filler volume might be required.

The battery door or other housing portion can include another housing detail such as a filler volume such as a pin or rod that enters the resonant pipe and runs the full length of the pipe. As previously seen in FIG. 3, the presence of a rod can then reduce the cross-sectional area of the resonant pipe. For larger battery doors creating larger back cavity volumes, smaller fill rod diameters can be used and for smaller battery doors creating smaller back cavity volumes, then larger fill rod diameters can be used.

In several embodiments, the joining of the main housing and the rear housing or battery cover creates or forms the resonant pipes. In other embodiments, the resonant pipes can also be formed or molded as part of the battery door or rear housing. Thus, each replacement battery door or cover can have its own molded resonant pipe dimensioned to match the back cavity volume formed when the battery door or rear cover is placed on the main housing of the portable electronic product. Further note, the embodiments herein also apply to any changeable housing detail that causes the loud speaker back cavity volume to change. Other portable electronic products such as phones may have exchangeable beauty rings, bezels, grills or other housing elements or features that affect the size of loud speaker back cavity volume. Although the embodiments are particularly applicable to all cellular phones and communication products, the embodiments herein are also equally applicable to other products such as personal digital assistants, portable speakers, MP3 players and almost any entertainment device with a high output load speaker (e.g., as opposed to a earpiece speaker).

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A portable product housing comprising:
   a housing detail forming at least a portion of a loud speaker back cavity having a pipe inner diameter for a resonant pipe; and
   a battery door feature that fills part of the resonant pipe.

2. The portable product housing of claim 1, wherein the battery door for the portable product also forms at least one side of the resonant pipe.

3. The portable product housing of claim 2, wherein the battery door fills part of a cross section area of the pipe inner diameter.

4. The portable product housing of claim 2, wherein the battery door fills part of a cross section area of the pipe inner diameter for a full length of the resonant pipe.

5. The portable product housing of claim 1, wherein the battery door comprises:
   a filler volume that reduces a cross section area of the pipe inner diameter.

6. The portable product housing of claim 1, wherein the battery door comprises:
   a rod that resides within the resonant pipe and runs a full length of the resonant pipe.

7. The portable product housing of claim 5, wherein the filler volume runs a full length of the resonant pipe.

8. The portable product housing of claim 1, wherein the battery door comprises:
   an integrated pipe molded as part of the battery door that provides a resonant pipe matched to a loud speaker back cavity volume created from mounting the battery door on to the portable product.

9. The portable product housing of claim 1, wherein the portable product housing comprises one or more of: exchangeable beauty rings, bezels, grills, over-molds, replacement front housings, or replacement rear housings for the portable product that modify the loud speaker back cavity.

10. The portable product housing of claim 1, wherein the portable product housing comprises one or more of: exchangeable beauty rings, bezels, grills, over-molds, replacement front housings, or replacement rear housings for the portable product that modify a cross section area of the pipe inner diameter.

11. A battery door for a portable product, comprising:
    a housing detail forming at least a portion of a loud speaker back cavity having a pipe inner diameter for a resonant pipe within the portable product; and
    a battery door feature that fills part of the resonant pipe.

12. The battery door of claim 11, wherein the battery door fills part of a cross section area of the pipe inner diameter for a full length of the resonant pipe.

13. The battery door of claim 11, wherein the battery door comprises:
    a filler volume that reduces a cross section area of the pipe inner diameter.

14. The battery door of claim 11, wherein the battery door comprises:
    an integrated pipe molded as part of the battery door that provides a resonant pipe matched to a loud speaker back cavity volume created from mounting the battery door on to the portable product.

15. A portable audio product having an interchangeable housing, comprising:
    a housing detail forming at least a portion of a loud speaker back cavity having a pipe inner diameter for a resonant pipe;
    battery door feature that fills part of the resonant pipe.

16. The portable communication product of claim 15, wherein the battery door fills part of a cross section area of the pipe inner diameter.

17. The portable communication product of claim 15, wherein the battery door comprises:
    a filler volume that reduces a cross section area of the pipe inner diameter and runs a full length of the resonant pipe.

18. The portable communication product of claim 15, wherein the battery door comprises:
    an integrated pipe molded as part of the battery door that provides a resonant pipe matched to a loud speaker back cavity volume created from mounting the battery door on to the portable communication product.

19. The portable communication product of claim 15, wherein the portable communication product is at least one of: a cellular phone, a two-way radio, a smart phone, a personal digital assistant, laptop computer, an MP3 Player, portable speakers, and a portable music player.

20. The portable product housing of claim 1, wherein the battery door defines at least part of a loud speaker back cavity volume.

* * * * *